(12) United States Patent
Wright et al.

(10) Patent No.: US 10,914,551 B2
(45) Date of Patent: Feb. 9, 2021

(54) VEHICLE DEVICE SEPARATION SYSTEM WITH TELESCOPING PISTON SPRINGS

(71) Applicant: Raytheon Company, Waltham, MA (US)

(72) Inventors: Philip Wright, New Palestine, IN (US); Jayson Kahle Bopp, Fishers, IN (US); Stephen A. Streib, Greenwood, IN (US); Brian R. Kavalar, Indianapolis, IN (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/217,766

(22) Filed: Dec. 12, 2018

(65) Prior Publication Data

US 2020/0025513 A1   Jan. 23, 2020

Related U.S. Application Data

(60) Provisional application No. 62/599,039, filed on Dec. 15, 2017.

(51) Int. Cl.
*F41F 3/06* (2006.01)
*F41F 5/00* (2006.01)

(52) U.S. Cl.
CPC . *F41F 3/06* (2013.01); *F41F 5/00* (2013.01)

(58) Field of Classification Search
CPC .......... F41F 3/06; F41F 5/00; B64D 1/02–06; B64D 7/08; B64C 2201/121

(Continued)

(56) References Cited

U.S. PATENT DOCUMENTS

| 119,254 A | 9/1871 | Vose |
| 2,535,095 A * | 12/1950 | Schwartz ................. B64D 1/04 |
| | | 74/2 |

(Continued)

FOREIGN PATENT DOCUMENTS

| EP | 1 647 482 | 4/2006 |
| FR | 2 375 571 | 7/1978 |
| WO | 2016/199132 | 12/2016 |

OTHER PUBLICATIONS

International Search Report and Written Opinion for corresponding International Application PCT/US2018/065163 dated Oct. 28, 2019.

*Primary Examiner* — Stephen Johnson
*Assistant Examiner* — Benjamin S Gomberg
(74) *Attorney, Agent, or Firm* — Renner, Otto, Boiselle & Sklar, LLP (57) ABSTRACT

An ejector system for ejecting/separating a store, such as a weapon, from a launch platform includes a pair of spring assemblies that each include nested springs that are contained in a housing when the spring assemblies are in a compressed configuration. To separate the store from the aircraft the spring assemblies each move from the initial compressed configuration to an extended configuration, using the potential energy stored in the springs when compressed. The extension of the springs extends the springs mostly out of the spring assembly housings, extending telescoped sleeves of the spring assemblies. The extension of the spring assemblies provides a safe and steady way of separating the store from the launch platform, while having the advantages of being reusable, low cost and low weight, not producing any debris, and providing a softer push than may be produced by other separation mechanisms, such as the use of pyrotechnic devices.

21 Claims, 5 Drawing Sheets

(58) Field of Classification Search
USPC .......................................................... 89/1.59
See application file for complete search history.

(56) References Cited

U.S. PATENT DOCUMENTS

| | | | | |
|---|---|---|---|---|
| 2,819,033 | A * | 1/1958 | Boyce ..................... | B64D 1/04 |
| | | | | 244/137.4 |
| 2,826,120 | A * | 3/1958 | Lang ........................ | F41F 3/06 |
| | | | | 89/1.803 |
| 2,852,982 | A * | 9/1958 | Musser ................... | B64D 1/06 |
| | | | | 89/1.58 |
| 2,877,688 | A * | 3/1959 | Markil .................... | B64D 1/04 |
| | | | | 89/1.58 |
| 3,998,124 | A * | 12/1976 | Milhous .................. | B64D 1/04 |
| | | | | 89/1.55 |
| 5,904,323 | A * | 5/1999 | Jakubowski, Jr. ....... | B64D 7/08 |
| | | | | 244/137.4 |
| 6,951,185 | B1 | 10/2005 | Wiese | |
| 2002/0141812 | A1 | 10/2002 | Edelen et al. | |
| 2017/0327227 | A1 | 11/2017 | Tobias et al. | |
| 2019/0039733 | A1 * | 2/2019 | Hayat ..................... | F16B 45/02 |

* cited by examiner

120; # VEHICLE DEVICE SEPARATION SYSTEM WITH TELESCOPING PISTON SPRINGS

This application claims priority to U.S. Provisional Application 62/599,039, filed Dec. 15, 2017, which is incorporated by reference in its entirety.

FIELD OF THE INVENTION

The invention relates to devices and methods for separating munitions and other devices from aircraft and/or other launch platforms.

BACKGROUND OF THE INVENTION

Devices have been used in the past to separate munitions, such as bombs, from aircraft. One problem from releasing a munition is that the airstream around the aircraft may alter the course of the munition as it separates from the aircraft. This may be a particular problem when the munition is released from a bay, such as a bomb bay, within the aircraft.

Various approaches have been tried in the past, including just releasing the munition and letting gravity separate it. Applying separation forces from explosives or pneumatic systems have also been used. Nonetheless there is room for improvement in separation systems.

SUMMARY OF THE INVENTION

Various features related to a system for separating a store, such as a munition, from an aircraft and/or other launch platform are described. In one embodiment, the system includes a pair of spring assemblies with nested springs. In other embodiments, more than a pair of spring assemblies with nested springs may be used. The spring assemblies push the store away from the aircraft to achieve separation. The spring assemblies maintain contact with the store during an initial part of the separation process, keeping the store in a desired orientation during separation.

A device allows multiple springs to be used. The springs nest inside each other allowing the full height of the collapsed piston to be used as the solid length for each spring. This allows for longer extension lengths than a single spring with similar k value and solid height.

Such a device or system may allow: 1) application of the spring force in series in a telescoping piston system; and/or 2) previously-impossible lengths of telescoping pistons within a similar diameter and compressed system length and at a similar "k" value.

According to an aspect of the invention, an ejector system for separating a store from a launch platform includes: spring assemblies that engage different portions of the store; wherein the spring assemblies have a compressed position when the store is mechanically coupled to the launch platform; wherein the spring assemblies extend from the compressed position to an extended position to separate the store from the launch platform; and wherein each of the spring assemblies includes at least two nested springs.

According to an embodiment of any paragraph(s) of this summary, for each of the spring assemblies, the at least two nested springs includes a pair of nested coil springs, an inner spring and an outer spring.

According to an embodiment of any paragraph(s) of this summary, the outer spring has a larger wire diameter than that of the inner spring.

According to an embodiment of any paragraph(s) of this summary, the outer spring has a larger spring constant than that of the inner spring.

According to an embodiment of any paragraph(s) of this summary, each of the spring assemblies further includes a nesting device that mechanically engages both the inner spring and the outer spring.

According to an embodiment of any paragraph(s) of this summary, the nesting device includes a cylinder within which part of the inner spring is located, and a flange extending radially outward from an open end of the cylinder, with one end of the outer spring engaging the flange.

According to an embodiment of any paragraph(s) of this summary, the spring assemblies each include telescoping sleeves.

According to an embodiment of any paragraph(s) of this summary, the system further includes feet at free ends of the spring assemblies, with the feet mechanically engaging the store prior to separation of the store from the launch platform.

According to an embodiment of any paragraph(s) of this summary, the feet include respective pairs of arms extending outward and downward, the arms of each of the feet defining respective store-receiving recesses.

According to an embodiment of any paragraph(s) of this summary, the spring assemblies include respective housings that are mechanically coupled to a rack of the launch platform.

According to an embodiment of any paragraph(s) of this summary, the spring assemblies are mechanically coupled to the rack at respective forward and aft locations.

According to an embodiment of any paragraph(s) of this summary, for each of the spring assemblies the housing contains the coil springs and the sleeve portions when the spring assemblies are in the compressed position.

According to an embodiment of any paragraph(s) of this summary, the racks include retractable hooks for mechanically securing the store while the spring assemblies are in the compressed position.

According to an embodiment of any paragraph(s) of this summary, the spring assemblies each have a stroke of at least 25 cm (10 inches) from the compressed position to the extended position.

According to another aspect of the invention, a method of separating a store from a launch platform includes the steps of: releasing hooks coupling the store to a rack of the launch platform; and pushing the store away from the launch platform by extending spring assemblies that are coupled to the rack, wherein the extending includes, for each of the assemblies, extending nested coil springs.

According to an embodiment of any paragraph(s) of this summary, the pushing includes maintaining contact between the spring assemblies and the store throughout a stroke of the spring assemblies, as the spring assemblies extend from a compressed position to an extended position.

According to an embodiment of any paragraph(s) of this summary, the pushing includes pushing with a force that does not exceed 8900 N (2000 pounds).

According to an embodiment of any paragraph(s) of this summary, the pushing includes pushing with feet of the spring assemblies that maintain orientation of the store during the pushing.

According to an embodiment of any paragraph(s) of this summary, the pushing includes pushing on forward and aft parts of the store.

According to an embodiment of any paragraph(s) of this summary, the extending the spring assemblies includes extending telescoping sleeves of the spring assemblies, with the springs of each of the spring assemblies extending simultaneously.

According to an embodiment of any paragraph(s) of this summary, a telescoping spring assembly has springs in which the spring forces are applied in series.

According to an embodiment of any paragraph(s) of this summary, a spring system has telescoping pistons.

According to an embodiment of any paragraph(s) of this summary, the pistons have similar diameters and/or compressed system lengths.

According to an embodiment of any paragraph(s) of this summary, springs of the system have similar spring constants.

According to an embodiment of any paragraph(s) of this summary, a spring system has multiple springs in series that nest inside one another.

According to an embodiment of any paragraph(s) of this summary, a spring assembly includes: two springs; and a nesting device that facilitates nesting of one of the springs inside the other of the springs.

According to an embodiment of any paragraph(s) of this summary, the spring assembly further includes a housing that houses the springs and the nesting device, with the springs and the nesting device within the housing when the springs are compressed.

To the accomplishment of the foregoing and related ends, the invention comprises the features hereinafter fully described and particularly pointed out in the claims. The following description and the annexed drawings set forth, in detail, certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention, and describe various features and other information.

DETAILED DESCRIPTION

An ejector system for ejecting/separating a store, such as a weapon, from a launch platform, such as an aircraft, includes a pair of spring assemblies that each include nested springs that are contained in a housing when the spring assemblies are in a compressed configuration. To separate the store from the aircraft, the spring assemblies each move from the initial compressed configuration to an extended configuration, using the potential energy stored in the springs when the springs are compressed. The extension of the springs extends the springs mostly out of the spring assembly housings, extending telescoped sleeves of the spring assemblies. The extension of the spring assemblies provides a safe and steady way of separating the store from the aircraft, while having the advantages of being reusable, low cost and low weight, not producing any debris, and providing a softer push than may be produced by other separation mechanisms, such as the use of pyrotechnic devices.

Figure 1:
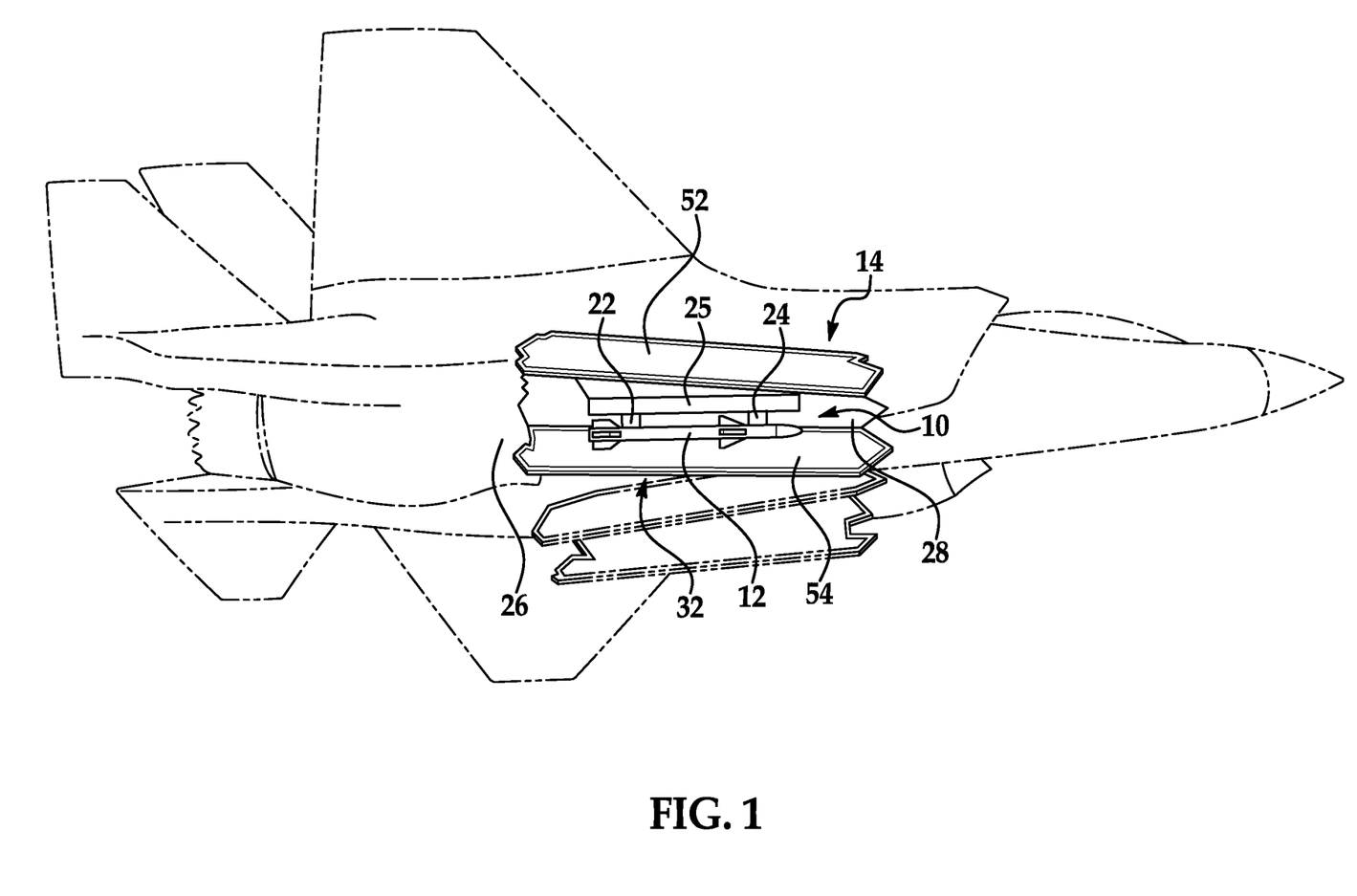
FIG. 1 is a view of an underside of an aircraft that includes an ejector/separation system according to an embodiment of the present invention.

FIG. 1 shows an ejector or separation system 10 used to separate a store 12 from a launch platform, such as an aircraft 14. The store 12 may be a munition or other weapon, such as a bomb or missile. Alternatively, the store 12 may be another sort of device, such as a sonar buoy, a leaflet bomb, or a fuel tank that can be jettisoned. The aircraft 14 may be a manned or unmanned aircraft of any of a variety of sorts. In one embodiment, the store 12 may be an aircraft, such as an unmanned air vehicle (UAV) or drone, that is launched from a larger aircraft such as the aircraft 14. The term aircraft should be construed broadly to include vehicles that move through the air, including airplanes (manned or unmanned), and helicopters.

The embodiments below are described in terms of use of an aircraft as a launching platform. However, other launch platforms may be used as alternatives, such as other types of vehicles (e.g., land vehicles such as tanks, or sea vehicles such as ships) or elevated locations, for example structures such as buildings or guard towers.

The separation system 10 includes at least two spring assemblies 22 and 24 that are in a compressed configuration when the store 12 is secured to the aircraft 14, as shown in FIG. 1. The spring assemblies 22 and 24 may be mounted to a rack 25, for example, a bomb rack. Initially the store 12 and the rack 25 may be located within an outer skin 26 of the aircraft 14, such as in a bay or enclosure 28 (for example a bomb bay) in a fuselage 32 of the aircraft 14. As an alternative the store 12 may be initially mounted on an outer surface of the aircraft 14, such as on the fuselage 32 or on a wing.

Figure 2:
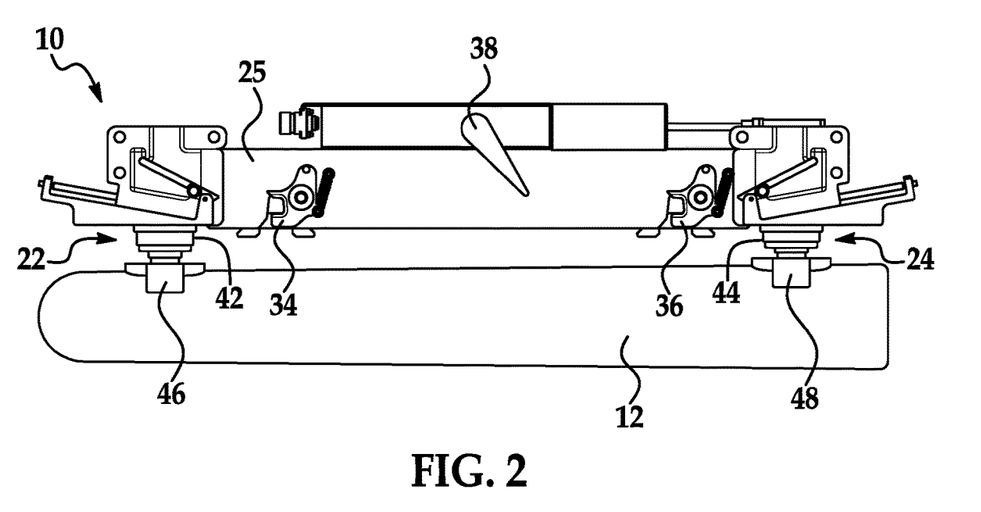
FIG. 2 is a side view of the ejector system of FIG. 1, with spring assemblies coupled to a rack and in a compressed position.
Figure 3:
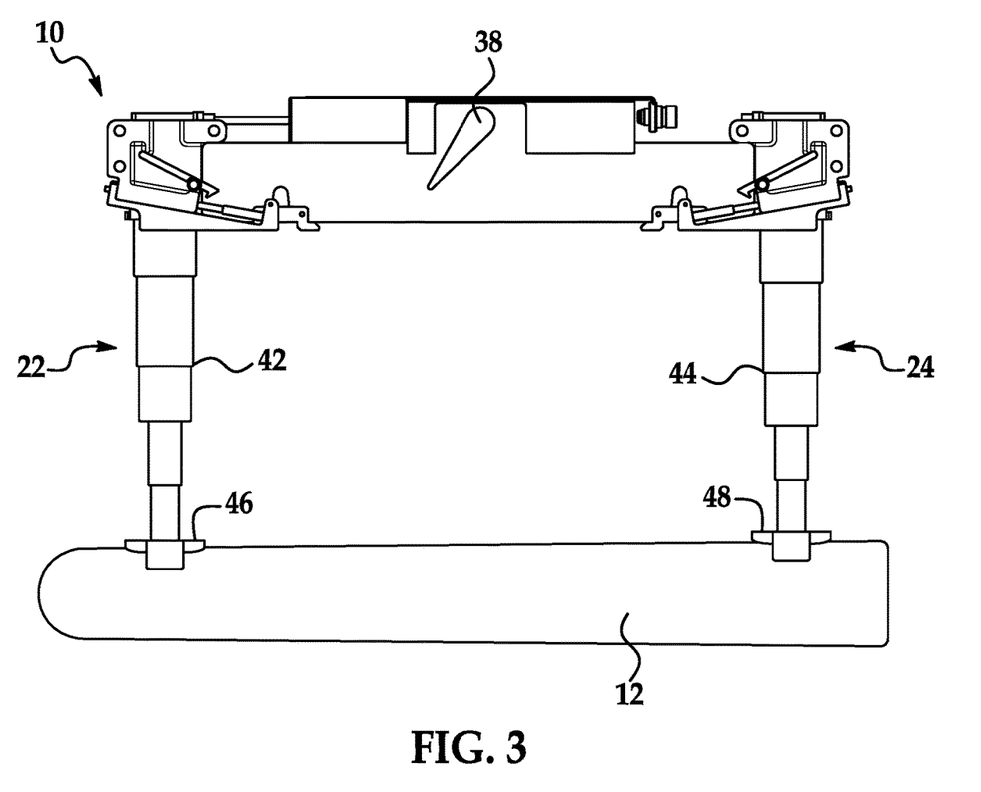
FIG. 3 is a side view of the ejector system of FIG. 1, with spring assemblies coupled to a rack and in an extended position.
Figure 4:
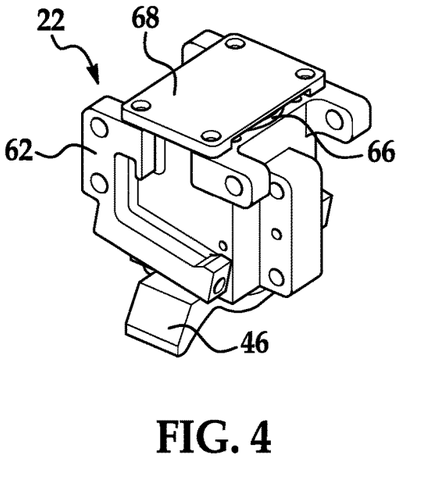
FIG. 4 is an oblique view of a spring assembly of the ejector system of FIG. 1, in a compressed position.
Figure 5:
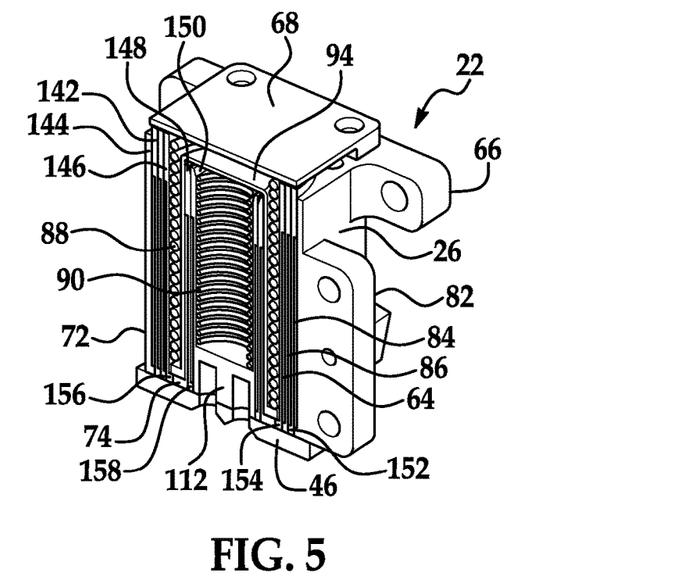
FIG. 5 is a cutaway view of the spring assembly of FIG. 4.
Figure 6:
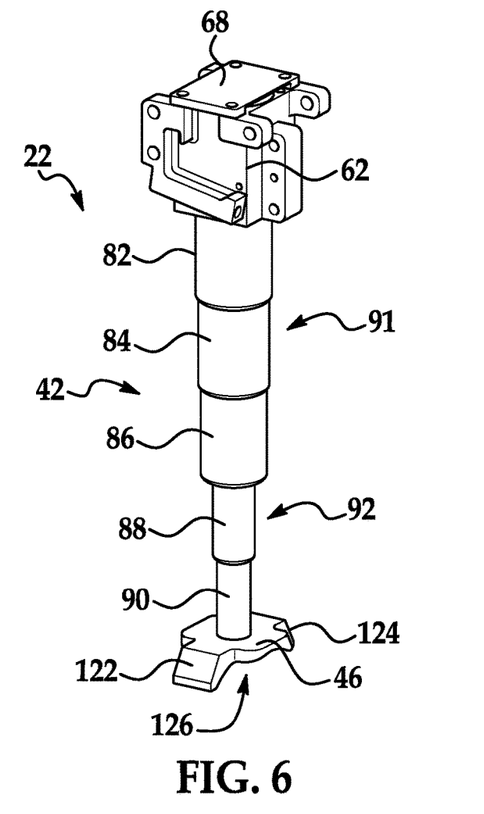
FIG. 6 is an oblique view of the spring assembly of FIG. 4, in an extended position.

Referring now in addition to FIGS. 2 and 3, the rack 25 includes forward hooks 34 and aft hooks 36 which are used to secure the munition or other device to the rack 25 prior to release and separation. A release mechanism 38 of the rack 25 is used to release the hooks 34 and 36 to initiate the disengagement/separation process. The release mechanism 38 may be a gravity-release mechanism. Such a gravity-release mechanism 38 may be the same or similar to those of standard or existing bomb racks.

The separation system 10 ejects the store 12 and separates the store 12 from the aircraft 14 by the action of spring forces within the assemblies 22 and 24. These spring forces are provided by nested springs within the spring assemblies 22 and 24. As will be explained in greater detailed below, the extension of the springs (of the spring assemblies 22 and 24) transforms the spring assemblies 22 and 24 from the compressed configuration shown in FIG. 2 to the extended configuration shown in FIG. 3. The extension of the springs extends respective telescoped sleeves 42 and 44 of the assemblies 22 and 24. Respective feet (or brackets) 46 and 48 of the assemblies 22 and 24 remain pressed against the store 12 as the store 12 is pushed away from the aircraft 14.

The ejection or separation process may involve opening of bay doors 52 and 54 (FIG. 1), and pushing the store 12 out of the bay 28 (FIG. 1). When exiting the bay 28, the store 12 is exposed to the air stream around the aircraft 14. This may place an undesired aerodynamic force on the store 12, for example unbalanced force tending to push upward on the store 12 when the store 12 is only partially in the airstream. The downward force provided by the assemblies 22 and 24 maintains the desired orientation of the store 12 during the ejection process.

In the illustrated embodiment, there are two spring assemblies 22 and 24, one forward of the other, pushing against fore and aft parts of the store 12. Alternatively, there may be a different number of spring assemblies, and/or a different configuration of the spring assemblies, for instance engaging different parts of the store 12.

Turning now in addition to FIGS. 4-8, the spring assembly 22 is described in further detail. The spring assembly 24 may have similar features, and may be substantially identical to the spring assembly 22.

The spring assembly 22 includes a housing 62 that defines a recess 64 that contains most of the other parts of the spring assembly 22 when the spring assembly 22 is in a compressed configuration or state. The housing 62 may be mechanically coupled to the rack 25 (FIG. 2) using bolts, rivets, or other suitable fasteners. Alternatively the housing could be fully integrated into the rack. The recess 64 is part of a bore 66 through the housing 62, a circular hole extending from one face to the opposite face. One side of the bore is closed off on one end by a cover 68.

Figure 7:
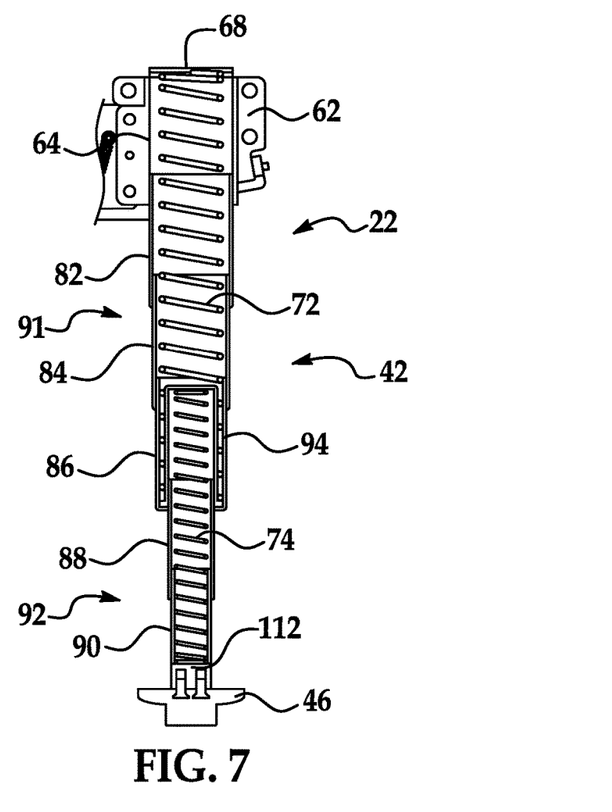
FIG. 7 is a cutaway view of the spring assembly of FIG. 6.
Figure 8:
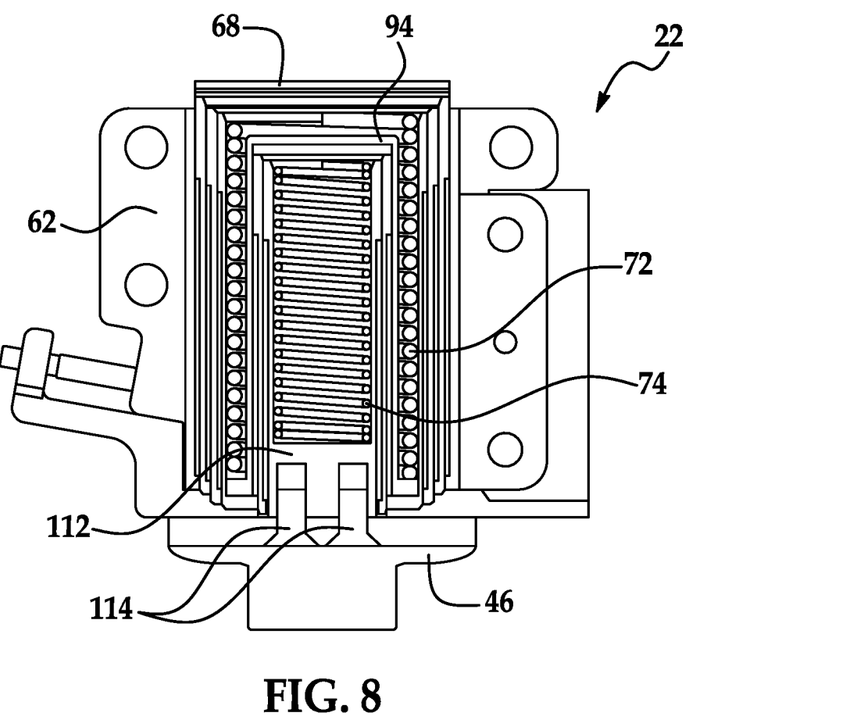
FIG. 8 is a side cutaway view of the spring assembly of FIG. 4, in a compressed position.

The spring assembly 22 includes a pair of springs, an outer spring 72 and an inner spring 74, as illustrated in FIG. 7. The springs 72 and 74 are coil springs, located within a telescoped sleeve 42 of the spring assembly 22. When the spring assembly 22 is in the compressed configuration (FIGS. 4 and 5) the inner spring 74 is nested within the outer spring 72.

The telescoped piston or sleeve 42 includes a number of hollow tubular segments or stages 82, 84, 86, 88, and 90, also referred to herein as sleeve segments or piston segments. The sleeve 42 includes a first portion 91 made up of the sleeve segments 82, 84, and 86, and a second portion 92 made up of the sleeve segments 88 and 90. A nesting device 94 is located within the sleeve 42 to provide a stop to ends of the springs 72 and 74. The sleeve stages 82, 84, and 86 expand along with the outer spring 72, and the sleeve stages 88 and 90 expand along with the inner spring 74. The sleeve stages 82-90 have stops or locks which limit the travel of the stage 82 relative to the housing 62, and the sleeve stages 82-90 relative to one another. The sleeve stage 82 slides relative to the housing 62, the sleeve stage 84 slides relative to the sleeve stage 82, the sleeve stage 86 slides relative to the sleeve stage 84, the sleeve stage 88 slides relative to the nesting device 94 within the sleeve stage 86, and the sleeve stage 90 slides relative to the sleeve stage 88. The sleeve stage 82 has a diameter less than that of the bore 66, and the subsequent sleeve stages or portions have successively reduced diameters.

Figure 9:
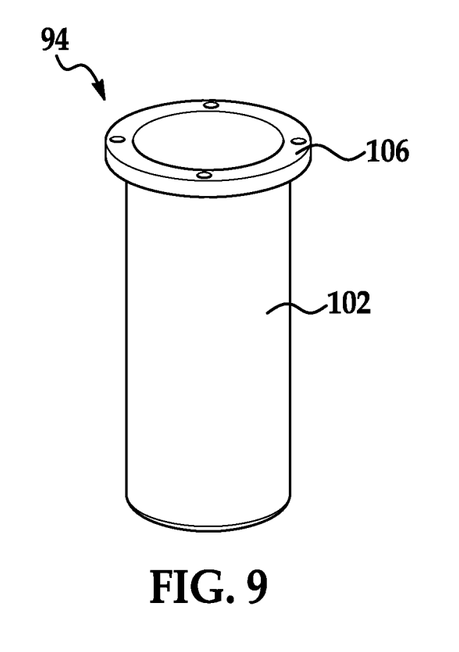
FIG. 9 is an oblique view of a nesting device of the spring assembly of FIG. 4.
Figure 10:
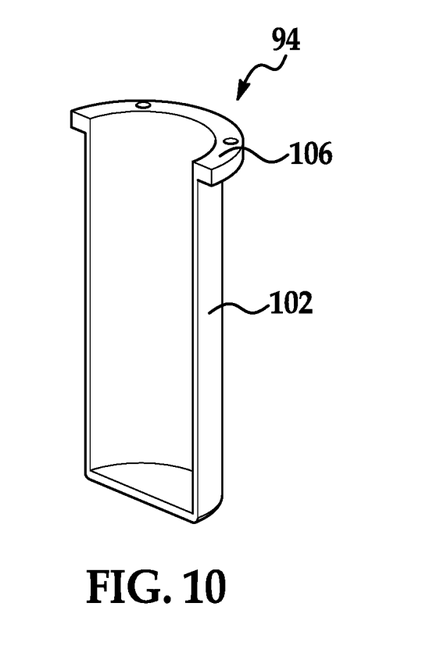
FIG. 10 is a cutaway view of the nesting device.

With reference to FIGS. 9 and 10, the nesting device 94 is a hollow cylinder 102 with a closed end 104, and an outward-extending flange 106 on the opposite end from the closed end 104. The nesting device 94 is fixedly attached to the sleeve stage 86, with the flange 106 attached to a lower end of the sleeve stage 86 by suitable fasteners, such as screws, bolts, or rivets, or by other suitable attachment mechanisms.

Returning now to FIGS. 4-8, an upper end of the outer spring 72 presses against the cover 68, and a lower end of the outer spring 72 presses against the nesting device flange 106. When the outer spring 72 is expanded it is contained along its length by the housing 62, in particular in the bore 66, and by the sleeve segments or stages 82, 84, and 86. A lower end of the outer spring 72 surrounds the nesting device cylinder 102.

An upper end of the inner spring 74 presses against the nesting device closed end 104, and a lower end of the inner spring 74 presses against a bottom end 112 of the sleeve segment 90. At the bottom end 112 the foot 46 is attached to the telescoping sleeve 42. This attachment may be by suitable fasteners, such as screws 114 or other suitable fasteners or attachment mechanisms, such as (for example) by welding. The foot 46 may have a pair of extending arms 122 and 124 extending out to the sides from its center. The arms 122 and 124 extend outward and diagonally downward, forming a store-receiving recess 126 for receiving and cradling part of the store 12.

The parts of the spring assembly 22 may be made using any of a variety of suitable materials. Non-limiting examples of suitable materials include spring steel for the springs 72 and 74; steel for the housing 62, the cover 68, and the foot 46; and aluminum for the sleeve segments 82-90 and the nesting device 94.

Many variations on the illustrated spring assembly 22 are possible. For example there may be additional nested springs if desired, and/or a different number of sleeve segments for each of the springs.

The spring assembly 22 is configured to have good structural characteristics, with the sleeve segments 82-90 nesting together within the housing 62 to support one another and transfer forces to and from the housing 62 and the foot 46. The successive sleeve segments 82-90 may decrease in length and diameter to allow them all to nest within one another. The sleeve segments 88 and 90 are configured to fit within the nesting device 94.

Features of the sleeve segments 82-90 aid engagement of the sleeve segments 82-90 with one another to limit or stop their sliding relative to one another, and to limit the overall extension of the sleeve or piston 42. As shown best in FIG. 5, the sleeve segments 82-90 have respective outward protrusions 142, 144, 146, 148, and 150 on the outer surfaces of their upper ends. In addition the sleeve segments 82-88 have respective inward protrusions 152, 154, 156, and 158 on the inner surfaces of their lower ends. As the piston 42 extends, the sleeve segments 82-90 slide relative to one another until the outward protrusion on one sleeve segment engages the inward protrusion of the previous sleeve segment.

The springs 72 and 74 are configured such that the solid heights of the springs 72 and 74 are less than the height of the nesting device 94. The springs 72 and 74 may have different solid heights, with for example the outer spring 72 having a greater solid height than the inner spring 74. The springs 72 and 74 may also have different wire diameters, with for example the outer spring 72 having a greater wire diameter than the inner spring 74, as is shown in the illustrated embodiment. Alternatively the springs 72 and 74 may have the same wire diameter. In one particular non-limiting embodiment the outer spring 72 is made of wire that has a diameter of 3.2 mm (0.126 inches) and the inner spring 74 is made of wire that has a diameter of 1.6 mm (0.063 inches). To maintain similar values of spring constant the wire diameter needs to get smaller as the coil diameter decreases, with all other things (such as the material for the springs) being kept the same.

The springs 72 and 74 may have similar spring constants. Alternatively there may be a variation between the spring constants of the springs 72 and 74. For example the outer spring 72 may have a greater spring constant than the inner spring 74. In one particular non-limiting embodiment the outer spring 72 having a spring constant of 700 N/m (4 lb/in) and the inner spring 74 having a spring constant of 525 N/m (3 lb/in). The springs 72 and 74 may have substantially the same spring constants. More broadly the spring constants of the springs 72 and 74 may be within 5%, 10%, 15%, 20% or 25% of each other, to give a few non-limiting values. The spring constants may be selected such that the total spring force is limited by what the store 12 can structurally support in the area where the feet 46 and 48 contact the store 12. In addition to the forces during ejection/separation of the store 12, forces during loading of the store 12 may be taken into account. It may be desirable to limit the spring forces in the springs 72 and 74 to what can be overcome by existing loading equipment, to facilitate installation of the store 12 on the rack 25 (FIG. 2) without damage to the store 12.

The use of multiple springs may reduce the free length of the springs 72 and 74 needed to maintain the structure of the springs 72 and 74. As a spring or other item has a significantly longer axial length than its width there is a risk of the item buckling when an axial force is applied. For compression springs, this value is around the point when the free length exceeds four times the outside diameter. Using multiple springs effectively cuts down on the free length (for example essentially cutting in half when two springs are used) and makes it harder for the spring to buckle.

Using the inner spring 74 as the basis for a single spring design, it would start out as only half the length of the combined springs 72 and 74. Doubling the length would also double the solid height and so to maintain the same solid height, the wire diameter would have to be halved. This would reduce the spring constant k, which is given by Equation (1):

$$k = \frac{Gd^4}{8nD^3} \quad (1)$$

where G is the modulus of rigidity of the spring material, d is the diameter of the spring wire, D is diameter of the spring coil, and n is the number of active coils of the spring. The spring constant thus varies as the fourth power of the spring wire diameter d.

In contrast the arrangement of the spring assemblies 22 and 24 drops the total spring constant only about half relative to a single spring like the inner spring 74, as given in Equation (2):

$$\frac{1}{k_{total}} = \frac{1}{k_{outer}} + \frac{1}{k_{inner}} \quad (2)$$

Relative to a single spring to provide the same stroke, the spring constant of the assemblies 22 and 24 may be better by a ratio of at least 50:1, to give a non-limiting example value.

The spring assemblies 22 and 24 may have a stroke, a distance that they extend in length, that is around 35 cm (14 inches). More broadly the extension during separation may be at least 5 cm (2 inches), at least 7.6 cm (3 inches), at least 15 cm (6 inches), at least 20 cm (8 inches), at least 25 cm (10 inches), or at least 30 cm (12 inches). The feet 46 and 48 maintain contact with the munition or other separated device (the store) 12 throughout most, nearly all, or all of this stroke. This allows mechanical support of the store 12 as the store 12 first encounters the air stream around the flight vehicle or aircraft 14. This support can aid in maintaining a desirable initial post-separation orientation of the store 12. In configuring the spring assemblies 22 and 24 it is desirable to maintain contact with the store 12 for a great distance (long stroke) to control orientation of the store 12 until the store 12 is well away from the aircraft. However the spring assemblies 22 and 24 are maintained in the extended conditions after separation of the store 12, so there is a cost in a long stroke that is too long.

In separation, the force pushing against the store 12 may be less than 8900 N (2000 pounds), or may be less than 4450 N (1000 pounds). In another embodiment, the force against the store 12 may be in the range of 445-4450 N (100-1000 pounds), 445-8900 N (100-2000 pounds), 445-44,500 N (100-10,000 pounds), or any range within these ranges. While some example values and ranges are specified above, it should be appreciated that these values and ranges are non-limiting.

The separation velocity between the store 12 and the aircraft 14 may be at least 2.7 m/sec (9 feet/sec) at the full extension of the spring assemblies 22 and 24. More broadly the separation velocity may be 2.1 m/sec (7 feet/sec) to 9.1 m/sec (30 feet/sec), although other velocities are possible.

In assembling the spring assembly 22 the lower sleeve portion 92 is assembled by sliding the sleeve segment 90 into the sleeve segment 88, and the sleeve segment 88 is slid into the sleeve segment 86. The inner spring 74 is then installed in the sleeve segment 90. After that the nesting device 94 is installed into the sleeve segment 86 while the inner spring 74 is compressed, with the nesting device 94 fastened to the sleeve segment 86.

The upper sleeve portion 91 is assembled by sliding the sleeve segment 86 into the sleeve segment 84, sliding the sleeve segment 84 into the sleeve segment 82, and then the sleeve segment 82 into the housing 62. The outer spring 72 is then installed into the housing 62 to rest against the flange 106 of the nesting device 94. The cover 68 is then used to compress the outer spring 72, and the cover 68 is fastened to the housing 62. Finally the foot 46 is attached to the sleeve segment 90.

In use the store 12 is pressed up against the feet 46 and 48 to compress the springs in the spring assemblies 22 and 24. This is done until the store 12 can be engaged with the hooks 34 and 36 (FIG. 2) of the rack 25 (FIG. 2).

The spring assemblies 22 and 24 may be configured to eject the store 12 at an angle relative to the aircraft 14, rather than in a straight downward direction. For example the store 12 may be ejected at a 6-degree angle relative to the aircraft 14. Such angled ejection/separation may facilitate ejection of several stores from an internal volume, through an opening that is not large enough for them to be separated vertically.

Figure 11:
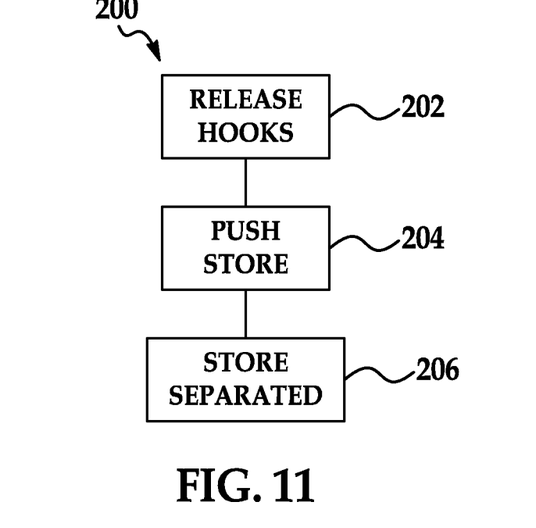
FIG. 11 is a high-level flow chart of a method of use of the ejector/separation system of FIG. 1.

FIG. 11 shows steps of a method 200 of separating the store 12 from the aircraft 14 using the system 10. In step 202, the hooks 34 and 36 are released, e.g., disengaged. This allows the spring assemblies 22 and 24 to extend from their initial compressed positions (illustrated in FIG. 2), pushing the store 12 away from the aircraft 14 (as illustrated in FIG. 3). The initial extensions maintain contact with between the feet 46 and 48, and fore and aft parts of the store 12, in step 204. During this step, there is a gentle pushing of the store 12 away from the aircraft 14. Subsequently, in step 206, the store 12 is released separating fully from the aircraft 14, e.g., with the store 12 no longer in contact with the feet 46 and 48.

The system 10 has many advantages (and/or potential advantages) over prior systems and/or alternative approaches. For example, such a system may be reusable, with the same parts employed in multiple munition/device (store) launches, without a need to replace propellants or explosives. The system may also be low maintenance, not requiring any sort of cleaning after each release. The system may be safer to use, with no explosives or other potentially hazardous materials (high potential energy) involved. The system may also be easier to use, for example with no need to reload/replace explosive charges or charge a compressed gas vessel. The system 10 may also provide a softer launch, with less push on the munition or other launched device. This may allow for a reduction in the structural strength in the munition casing, with associated reduced weight and reduced cost. Further, the soft-push launching may allow longer bomb rack life, due to forces being less extreme on the gravity-release mechanism versus those on forced-ejection bomb racks. The bomb rack 25 may be less robust structurally, due to reduced forces, and therefore may weigh less. The bomb rack also may be easier to manufacture, and may have a lower unit cost, for example relative to racks for cartridge or pneumatic mechanisms, which may have complicated internal cavities to route expanding pressurized gases to multiple places, including hook releases and pistons. In addition (or alternatively), the use of feet control release of the store 12 may result in improved control of orientation of the store 12 during the separation process. This may be of particular advantage for steerable weapons, such as munitions with control surfaces or fins, or that use navigational controls. It should be understood that this list of advantages is not comprehensive, nor is it intended that all of the above advantages are necessarily present in all systems incorporating inventive aspects described herein.

The system 10 may be contrasted with prior shortcomings and prior problems. Coil springs do not exist that possess high reaction forces (spring constant or "k" values) at large extension length to diameter ratios and simultaneously have small solid lengths. As a result, the effective length of a single spring-loaded telescoping piston is limited by the available spring. Systems that require longer extension lengths must either reduce the "k" value, increase the diameter or increase the solid length of their spring.

Previously, this problem was solved by: limiting the length of the piston system; reducing the "k" value (and supplementing it with additional pistons or accept less spring force); replacement of the spring force with other stored energy systems (such as a compressed gas or pressurized fluid); increasing the compressed length of the piston system (each segment gets taller and a larger solid length is available for the spring); and/or using different spring coil geometry (e.g. conical) to reduce the solid length. The systems described herein, such as the system 10, may overcome or avoid the problems and/or shortcomings with prior approaches.

Figure 12:
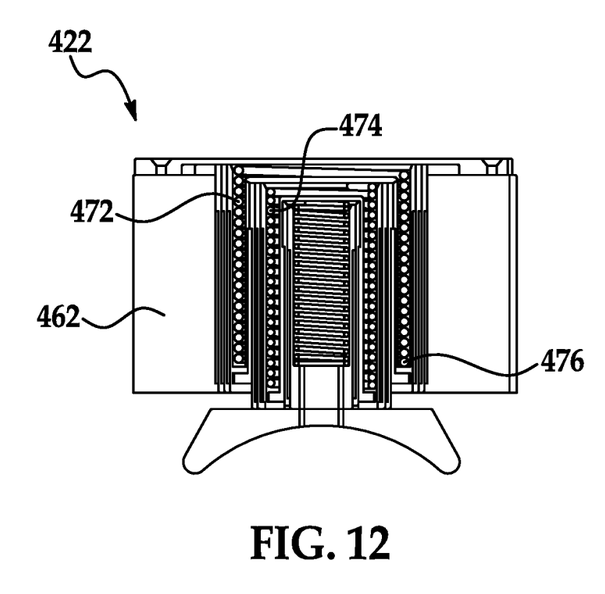
FIG. 12 is side cutaway view of a spring assembly according to an alternate embodiment of the present invention, in a compressed position.
Figure 13:
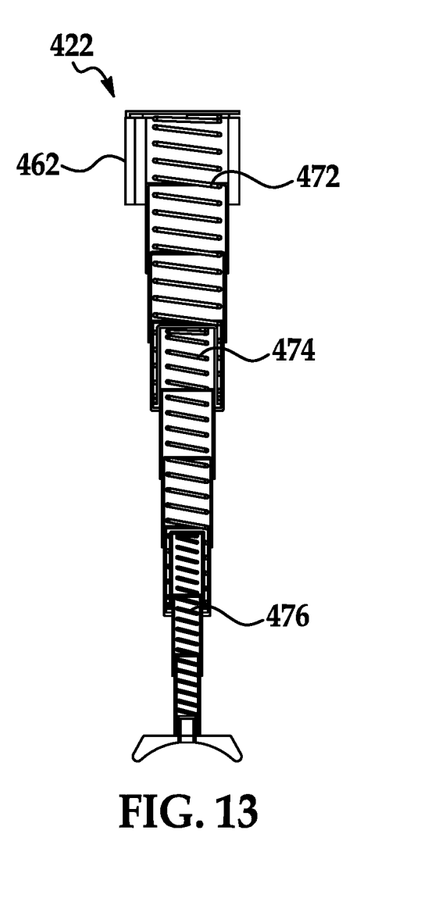
FIG. 13 is a side cutaway view of the spring assembly of FIG. 12, in an extended position.

FIGS. 12 and 13 show an additional embodiment, a spring assembly 422 which has three nested coil springs 472, 474, and 476, which nest within a housing 462 when the spring assembly 422 is in a compressed position. The spring assembly 422 may have a longer stroke than the spring assemblies 22 and 24 (FIG. 1), for example having a stroke of 50 cm (20 inches) or 54 cm (21.3 inches) or more. The spring assembly 422 may be part of an ejection/separation system such as the system 10 (FIG. 1), and sharing many of the other features of the system 10.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An ejector system for separating a store from a launch platform, the ejector system comprising:
   spring assemblies that engage different portions of the store;
   wherein the spring assemblies have a compressed position when the store is mechanically coupled to the launch platform;
   wherein the spring assemblies extend from the compressed position to an extended position to separate the store from the launch platform; and
   wherein each of the spring assemblies includes at least two nested springs, with spring forces from the at least two nested springs applied in series.

2. The system of claim 1, wherein, for each of the spring assemblies, the at least two nested springs include a pair of nested springs including an inner spring and an outer spring.

3. The system of claim 2, wherein the outer spring has a larger wire diameter than that of the inner spring.

4. The system of claim 2, wherein the outer spring has a larger spring constant than that of the inner spring.

5. The system of claim 2, wherein each of the spring assemblies further includes a nesting device between the inner spring and the outer spring, that mechanically engages both the inner spring and the outer spring.

6. The system of claim 5, wherein for each of the spring assemblies the nesting device is a sleeve that changes position as the spring assembly extends from the compressed position to the extended position.

7. An ejector system for separating a store from a launch platform, the ejector system comprising:
   spring assemblies that engage different portions of the store;
   wherein the spring assemblies have a compressed position when the store is mechanically coupled to the launch platform;

wherein the spring assemblies extend from the compressed position to an extended position to separate the store from the launch platform;
wherein each of the spring assemblies includes at least two nested springs;
wherein, for each of the spring assemblies, the at least two nested springs include a pair of nested coil springs including an inner spring and an outer spring; and
wherein each of the spring assemblies further includes a nesting device between the inner spring and the outer spring, that mechanically engages both the inner spring and the outer spring.

8. An ejector system for separating a store from a launch platform, the ejector system comprising:
spring assemblies that engage different portions of the store;
wherein the spring assemblies have a compressed position when the store is mechanically coupled to the launch platform;
wherein the spring assemblies extend from the compressed position to an extended position to separate the store from the launch platform;
wherein each of the spring assemblies includes at least two nested springs;
wherein, for each of the spring assemblies, the at least two nested springs include a pair of nested coil springs including an inner spring and an outer spring;
wherein each of the spring assemblies further includes a nesting device that mechanically engages both the inner spring and the outer spring; and
wherein the nesting device includes a cylinder within which part of the inner spring is located, and a flange extending radially outward from an open end of the cylinder, with one end of the outer spring directly engaging the flange.

9. An ejector system for separating a store from a launch platform, the ejector system comprising:
spring assemblies that engage different portions of the store;
wherein the spring assemblies have a compressed position when the store is mechanically coupled to the launch platform;
wherein the spring assemblies extend from the compressed position to an extended position to separate the store from the launch platform;
wherein each of the spring assemblies includes at least an inner spring and an outer spring; and
wherein the spring assemblies each include telescoping sleeves, with the inner spring and the outer spring extending over different respective portions of the telescoping sleeves.

10. The system of claim 9, further comprising feet at free ends of the spring assemblies, with the feet mechanically engaging the store prior to separation of the store from the launch platform.

11. The system of claim 10, wherein the feet include respective pairs of arms extending outward and downward, the arms of each of the feet defining respective store-receiving recesses.

12. The system of claim 9,
wherein the spring assemblies include respective housings that are mechanically coupled to a rack of the launch platform; and
wherein the spring assemblies are mechanically coupled to the rack at respective forward and aft locations.

13. The system of claim 12, wherein the rack includes retractable hooks for mechanically securing the store while the spring assemblies are in the compressed position.

14. The system of claim 9, wherein the spring assemblies each have a stroke of at least 25 cm from the compressed position to the extended position.

15. A method of separating a store from a launch platform, the method comprising:
releasing hooks coupling the store to a rack of the launch platform; and
pushing the store away from the launch platform by extending spring assemblies that are coupled to the rack, wherein the extending includes, for each of the spring assemblies, extending nested coil springs;
wherein the spring assemblies engage different portions of the store;
wherein the spring assemblies have a compressed position when the store is mechanically coupled to the launch platform;
wherein the pushing includes the spring assemblies extending from the compressed position to an extended position to separate the store from the launch platform;
wherein for each of the spring assemblies, the nested coil springs include at least an inner spring and an outer spring; and
wherein the spring assemblies each include telescoping sleeves, with the pushing including extending the telescoping sleeves, and extending the inner spring and the outer spring over different respective portions of the telescoping sleeves.

16. The method of claim 15, wherein the pushing includes maintaining contact between the spring assemblies and the store throughout a stroke of the spring assemblies, as the spring assemblies extend from the compressed position to the extended position.

17. The method of claim 15, wherein the stroke is at least 25 cm.

18. The method of claim 14, wherein the pushing includes pushing with a force that does not exceed 8900 N (2000 pounds).

19. The method of claim 15, wherein the pushing includes pushing with feet of the spring assemblies that maintain an orientation of the store during the pushing.

20. The method of claim 14, wherein the pushing includes pushing on forward and aft parts of the store.

21. The method of claim 15, wherein the extending of the spring assemblies includes extending the telescoping sleeves of the spring assemblies, with the inner spring and the outer spring of each of the spring assemblies extending simultaneously.

* * * * *